United States Patent
Öjergren et al.

(10) Patent No.: US 12,037,934 B2
(45) Date of Patent: Jul. 16, 2024

(54) COOLANT DRAINING TOOL FOR ENERGY STORAGE SYSTEMS

(71) Applicant: Volvo Truck Corporation, Gothenburg (SE)

(72) Inventors: Johan Öjergren, Kungälv (SE); Oskar Hedberg, Västra Götaland (SE); Kenny Leandersson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/072,178

(22) Filed: Nov. 30, 2022

(65) Prior Publication Data
US 2023/0184158 A1 Jun. 15, 2023

(30) Foreign Application Priority Data
Dec. 15, 2021 (EP) .................................... 21214928

(51) Int. Cl.
*F01P 11/02* (2006.01)
*F01M 11/04* (2006.01)

(52) U.S. Cl.
CPC ...... *F01P 11/0276* (2013.01); *F01M 11/0408* (2013.01)

(58) Field of Classification Search
CPC ... F01P 11/0276; F01P 11/02; F01M 11/0408; B60K 1/04; B60K 2001/005; B60K 2001/0438; B60Y 2200/142
See application file for complete search history.

(56) References Cited

U.S. PATENT DOCUMENTS

| | | | |
|---|---|---|---|
| 3,387,621 A * | 6/1968 | Schaff | F16N 21/06 251/149.6 |
| 5,048,578 A | 9/1991 | Dorf et al. | |
| 6,113,072 A | 9/2000 | Wickett | |
| 2012/0091962 A1* | 4/2012 | DeFrank | H02J 7/0013 320/112 |

FOREIGN PATENT DOCUMENTS

| | | |
|---|---|---|
| EP | 0921281 A1 | 6/1999 |
| KR | 19980042229 U | 9/1998 |

OTHER PUBLICATIONS

Extended European Search Report dated Jun. 14, 2022 for European Patent Application No. 21214928.0, 9 pages.
Ubuy Co., No-Spill Oil Drain Kit, Product Listing, 2021, 5 pages.
Stahlbus, Stahlbus Oil Drain Valve 1/2", Product Listing, accessed on the Internet on Dec. 8, 2021 at: https://www.stahlbus.de/lng/en/oil-drain-valve/stainless-steel/stahlbus-oil-drain-valve-12-20unfx12mm-stainless-steel-14305-set.html, 9 pages.

* cited by examiner

*Primary Examiner* — Jacob M Amick
*Assistant Examiner* — Charles J Brauch
(74) *Attorney, Agent, or Firm* — Sage Patent Group

(57) ABSTRACT

A coolant draining tool for draining a coolant from an electrical storage system, ESS, of a heavy-duty vehicle, wherein the coolant draining tool is of elongated shape and includes an internal tubular channel for guiding a flow of coolant in a discharge direction, the coolant draining tool including an externally threaded portion which encloses the tubular channel at a distal first end of the coolant draining tool, wherein a valve engagement member is arranged centered in the tubular channel at the first end of the coolant draining tool, the valve engagement member being arranged to engage a spring-loaded valve of an ESS connector to bias the valve into an open position.

14 Claims, 2 Drawing Sheets

COOLANT DRAINING TOOL FOR ENERGY STORAGE SYSTEMS

CROSS REFERENCE TO RELATED APPLICATIONS

The present application claims benefit of priority to European Patent Application No. 21214928.0, filed Dec. 15, 2021, and is assigned to the same assignee as the present application and is incorporated herein by reference in its entirety.

TECHNICAL FIELD

The present disclosure relates to energy storage systems for electric vehicles and for hybrid electric vehicles. The disclosure can be applied in heavy-duty vehicles, such as trucks, buses and construction equipment. Although the disclosure will be described mainly with respect to heavy-duty vehicles, the disclosure is not restricted to this particular vehicle class but may also be used in other vehicles such as cars and marine vessels.

BACKGROUND

Energy storage systems (ESS) for use on heavy-duty vehicles, such as battery packs and fuel cell arrangements, normally employ cooling in order to control the operating temperature of the ESS. The cooling system often comprises a coolant which is circulated in the ESS in order to transport heat away from the ESS.

It is sometimes desired to drain the coolant from the cooling system, e.g., during maintenance.

However, the tools used for draining legacy cooling systems on heavy-duty vehicles may not always fit modern connectors on, e.g., battery electric heavy-duty vehicles.

SUMMARY

It is an object of the present disclosure to provide tools which facilitate convenient draining of coolant from an ESS cooling system.

This object is obtained by a coolant draining tool for draining a coolant from an ESS cooling system of a heavy-duty vehicle. The coolant draining tool is of elongated shape and comprises an internal tubular channel for guiding a flow of coolant in a discharge direction.

The coolant draining tool further comprises an externally threaded portion which encloses the tubular channel at a distal first end of the coolant draining tool. A valve engagement member is arranged centered in the tubular channel at the first end of the coolant draining tool, the valve engagement member being arranged to engage a spring-loaded valve of an ESS connector to bias the valve into an open position, whereby coolant may be drained from the cooling system. This draining tool allows for convenient and efficient draining of coolant from a cooling system. The tool interfaces with an internal thread of a connector, and therefore does not need to match an outside dimension of the cooling system connector. The externally threaded portion preferably comprises an ISO metric screw thread with major diameter of 8 mm and a pitch of 1 mm, which allows the tool to mate with a common type of ESS cooling system connector.

According to some aspects, the valve engagement member comprises a cross-hair design with a center portion arranged to engage the spring-loaded valve of the ESS connector. This cross-hair design is mechanically robust and also provides mechanical integrity to the tubular channel, which is an advantage. The cross-hair design also efficiently positions the center portion to engage the spring-loaded valve on the ESS connector. Alternatively, or as a complement, the valve engagement member comprises a mesh or a grid arranged to engage the spring-loaded valve of the ESS connector.

The discharge portion of the coolant draining tool optionally comprises a grip for the hand of a user, which makes it more convenient to attach the tool to a connector of an ESS cooling system. The discharge portion may furthermore comprise a section of hexagonal cross-section configured to engage a spanner, which can be used to tighten the tool in mated position with respect to the ESS cooling system connector.

According to some further aspects, the discharge portion comprises a nipple configured to mate with a coolant draining hose. This hose allows for guiding the drained coolant to a container purposed to hold the coolant. The nipple can be designed as a radiator drainage nipple, which allows re-use of existing radiator drainage systems.

An optional flow meter is arranged in the tubular channel to measure an amount of coolant passing the tubular channel. This flow meter can be used to verify that no leakage has occurred, and that the expected amount of coolant is drained from the system, thus ensuring that the cooling system is empty prior to servicing.

The draining tools disclosed herein may be produced by additive manufacturing in a plastic or metal material. This is an advantage since it allows workshops to efficiently produce the tool on demand.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the disclosure cited as examples. In the drawings.

DETAILED DESCRIPTION OF EXAMPLE EMBODIMENTS OF THE DISCLOSURE

Figure 1:
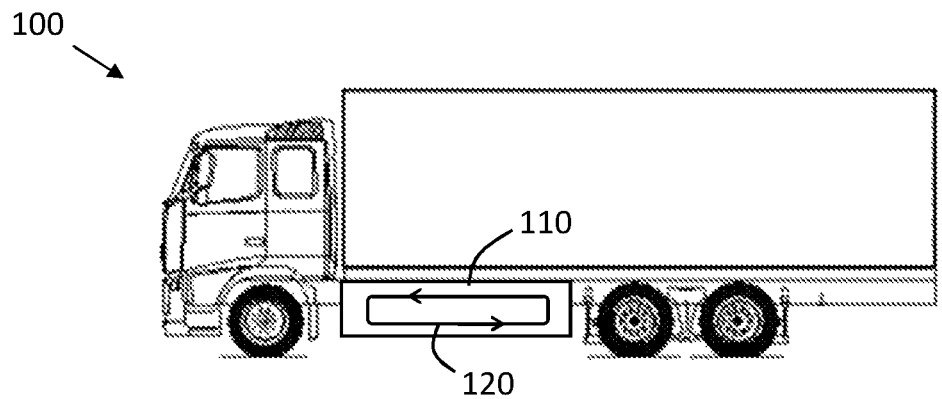
FIG. 1 illustrates an example battery-powered heavy-duty vehicle.

The disclosure will now be described more fully hereinafter with reference to the accompanying drawings, in which certain aspects of the disclosure are shown. This disclosure may, however, be embodied in many different forms and should not be construed as limited to the embodiments and aspects set forth herein; rather, these embodiments are provided by way of example so that this disclosure will be thorough and complete, and will fully convey the scope of the disclosure to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

FIG. 1 shows an example electric heavy-duty vehicle 100. The vehicle is powered by an ESS 110, which may be a battery pack and/or a fuel cell arrangement.

The operating temperature of the ESS 110 is controlled by means of a cooling system, in which a coolant is circulating 120 to transport heat away from the ESS.

The cooling system is filled by either using vacuum to draw coolant into the system, or via topside ESS nipples.

During servicing of the vehicle 100, it may be desired to drain the coolant from the cooling system. To do this, a draining tool may be employed.

Figure 2:
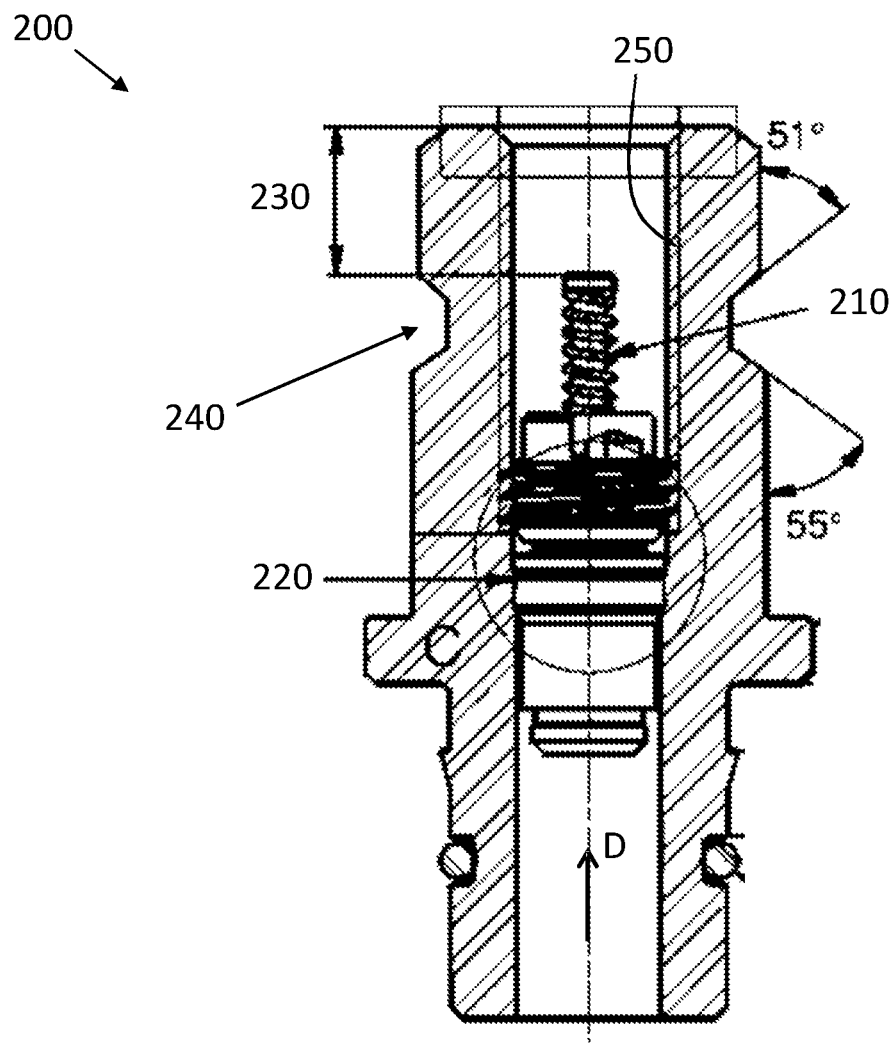
FIG. 2 shows a draining connector of a cooling system.

FIG. 2 illustrates a cooling system connector 200 which may be found on some heavy-duty vehicles. The connector provides an interface to the cooling system, and can be used to drain the system. The connector 200 comprises a valve 220 that is spring-loaded 210 into a closed position by a spring 210. If the spring 210 is depressed into the connector past its end point 230, the valve 220 opens and coolant may freely flow out from the cooling system in direction D.

The connector 200 is arranged to receive a draining connector which mates with the groove 240 to receive the flow of coolant. The dimensions of the connector 200 may however differ from common draining tools used for traditional heavy-duty vehicles. Thus, legacy tools for draining, e.g., a radiator on a truck, cannot be used to interface with the connector 200.

Fortunately, the connector 200 shown in FIG. 2 comprises an inner thread portion 250. This inner threaded portion may have dimensions corresponding to an M8×1 thread, i.e., an ISO metric screw thread with major diameter of 8 mm and a pitch of 1 mm. It has been realized that this inner thread can be exploited by a new type of coolant draining tool arranged to open the valve 200 in order to allow the coolant to flow in direction D out from the cooling system of the ESS, where it can be collected in a container designed for the purpose.

Figure 3:
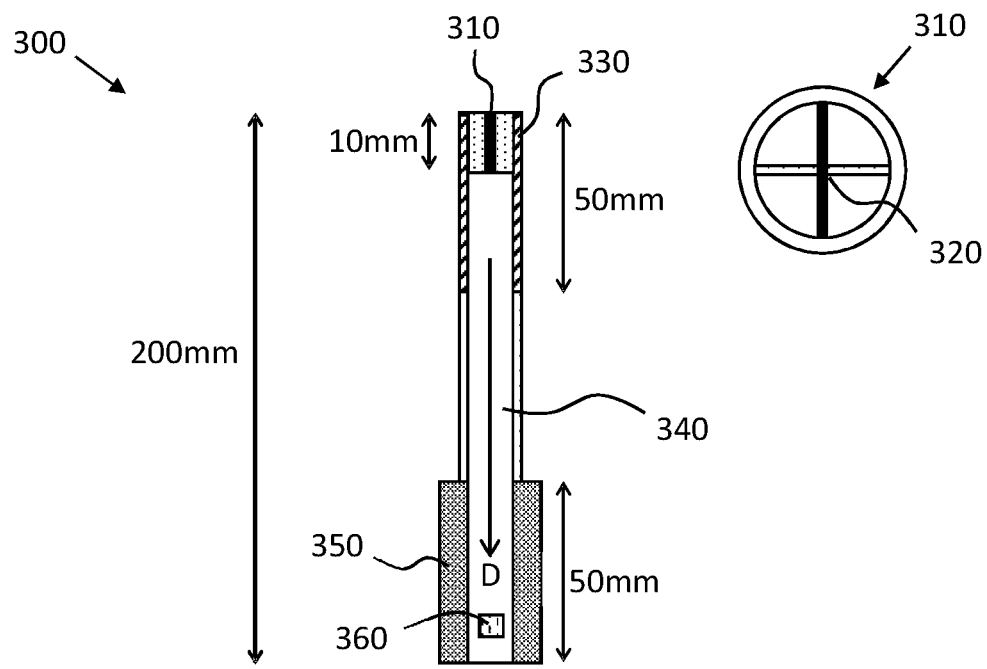
FIGS. 3-4 illustrate example coolant draining tools.
Figure 4:
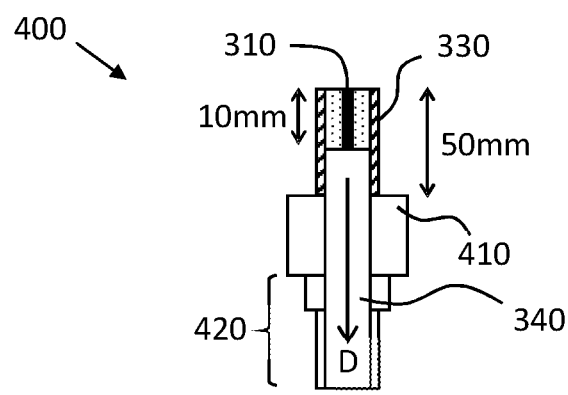

FIG. 3 and FIG. 4 illustrate example coolant draining tools 300, 400 for draining a coolant from an ESS of a heavy-duty vehicle, such as the vehicle 100 discussed above in connection to FIG. 1. The purpose of the tool is to access the cooling system and drain coolant from the system, or at least adjust the level of coolant in the system by removing some of the coolant. The example coolant draining tools 300, 400 are both of elongated shape and comprises an internal tubular channel 340 for guiding a flow of coolant in a discharge direction D. The example 300 has an overall length of 200 mm, which allows a service technician to more easily access the connector of the cooling system. This can be an advantage in case space is limited and the connector 200 is mounted in a tight location behind or adjacent to some other vehicle components. A flow meter 360 can be arranged in the tubular channel 340 in order to measure a flow of coolant from the cooling system. This measurement can be used to determine when the cooling system is empty of coolant. The measurement can also be used to determine if there has been a leakage in the cooling system, i.e., if the amount of drained coolant is smaller than an expected amount of drained coolant.

The coolant draining tools 300, 400 comprise respective externally threaded portions 330 which encloses the tubular channel 340 at a distal first end of the coolant draining tool 300, 400. Thus, at an end of the elongated draining tools, there is an externally threaded portion configured to engage the internal threaded portion 250 of the connector 200. The draining tool can thus be screwed into the connector 200 and held in position by the threads during draining of the coolant from the cooling system. The threaded portion is often sufficient to prevent coolant leakage. However, a gasket can of course be arranged at the first end to provide a more secure seal between the draining tool 300, 400 and the ESS cooling system connector 200. The externally threaded portion 330 preferably comprises an ISO metric screw thread with major diameter of 8 mm and a pitch of 1 mm, which then matches the internal threads 250 on the connector. The length of the threaded portion 330 in FIG. 3 is about 50 mm, and about 20 mm in FIG. 4. This length can vary between realizations. It is, however, preferred that the threaded portion is such as to allow the draining tool to enter a sufficient distance into the connector 200.

Figure 5:
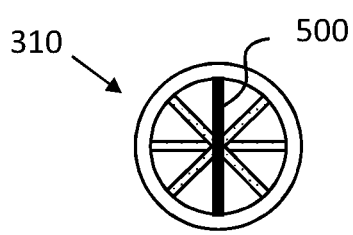
FIGS. 5-6 illustrate details of an example coolant draining tool.
Figure 6:
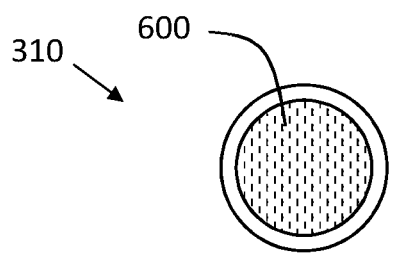

A valve engagement member 310 is arranged centered in the tubular channel at the first end of the coolant draining tools 300, 400. This valve engagement member 310 is arranged to engage the spring-loaded valve 220 of the ESS connector 200 to bias the valve 200 into an open position. As the draining tool is screwed into the connector 200, the valve engagement member pushes onto the spring-loaded valve to open the valve. Once this happens, coolant may flow freely in the direction D from the cooling system, via the tubular channel 340 and out from the draining tool, e.g., into a container for holding the coolant. The valve engagement member 310 optionally comprises a cross-hair design 320 as illustrated in FIG. 3 with a center portion 320 arranged to engage the spring-loaded valve 220 of the ESS connector 200. The cross-hair design comprises planar sections, or rods, extending traversal to the tubular channel 340 to form a center piece at the middle of the tubular channel. This center piece then engages the valve 240 to open the valve as the draining tool is screwed into the connector 200. More than two planar sections 500 or rods can of course be used, as illustrated in FIG. 5. Alternatively, or as a complement, a grid or mesh 600 can be used to engage the valve 240. This grid or mesh then also provides the additional effect of filtering the coolant, which could be an advantage in some situations.

The coolant draining tool 300 optionally comprises a grip for the hand of a user, arranged in connection to the discharge portion 350, as illustrated in FIG. 3. This grip provides a convenient means for holding the tool and for screwing the tool into the connector 200. The discharge portion 350, 410 optionally also comprises a section of hexagonal cross-section configured to engage a spanner, which can be used to tighten the bond between draining tool and connector 200.

The discharge portion 350, 410 may also comprise a nipple configured to mate with a coolant draining hose. Thus, a hose can be connected to the ESS cooling system, and the coolant can be guided via the hose to a container or the like for collecting the coolant. This nipple could advantageously be realized as a radiator drainage nipple having dimensions in accordance with a TEMA 1800 nipple for cooling systems on heavy-duty vehicles. The TEMA 1800 nipple is widely used in hydraulic installations and will therefore not be discussed in more detail herein.

The draining tool can be produced by additive manufacturing, and may be realized as a plastic draining tool, perhaps integrally formed (as a single piece of plastic), which is a low-cost option for producing the tool. The draining tool can of course also be manufactured in a metal material, to provide a more durable tool which can be re-used several times.

The invention claimed is:

1. A coolant draining tool for draining a coolant from an electrical storage system, ESS, of a heavy-duty vehicle,
   wherein the coolant draining tool is of elongated shape and comprises an internal tubular channel for guiding a flow of coolant in a discharge direction,
   the coolant draining tool comprising an externally threaded portion which encloses the tubular channel at a distal first end of the coolant draining tool,
   wherein a valve engagement member is arranged centered in the tubular channel at the first end of the coolant draining tool, the valve engagement member being arranged to engage a spring-loaded valve of an ESS connector to bias the valve into an open position, the valve engagement member comprising a cross-hair design with a center portion arranged to engage the spring-loaded valve of the ESS connector.

2. The coolant draining tool according to claim 1, where the externally threaded portion comprises an ISO metric screw thread with major diameter of 8 mm and a pitch of 1 mm.

3. The coolant draining tool according to claim 1, where the valve engagement member comprises a mesh or a grid arranged to engage the spring-loaded valve of the ESS connector.

4. The coolant draining tool according to claim 1, further comprising a discharge portion that comprises a grip for a hand of a user.

5. The coolant draining tool according to claim 4, wherein the discharge portion comprises a section of hexagonal cross-section configured to engage a spanner.

6. The coolant draining tool according to claim 4, wherein the discharge portion comprises a nipple configured to mate with a coolant draining hose.

7. The coolant draining tool according to claim 6, where the nipple is a radiator drainage nipple for a heavy-duty vehicle.

8. The coolant draining tool according to claim 6, where the nipple is arranged to mate with a hose arranged to guide the coolant to a storage container.

9. The coolant draining tool according to claim 1, wherein the draining tool is produced by additive manufacturing.

10. The coolant draining tool according to claim 1, wherein the draining tool is manufactured in a plastic material.

11. The coolant draining tool according to claim 1, wherein the draining tool is manufactured in a metal material.

12. The coolant draining tool according to claim 1, wherein a flow meter is arranged in the tubular channel to measure an amount of coolant passing the tubular channel.

13. The coolant draining tool according to claim 1, wherein the cross-hair design comprises planar sections extending transversely to the tubular channel to form a center piece arranged to engage the spring-loaded valve of the EES connector.

14. The coolant draining tool according to claim 1, wherein the cross-hair design comprises rods extending transversely to the tubular channel to form a center piece arranged to engage the spring-loaded valve of the EES connector.

* * * * *